United States Patent
Shi et al.

(10) Patent No.: US 12,289,768 B2
(45) Date of Patent: Apr. 29, 2025

(54) RANDOM ACCESS METHOD AND APPARATUS, USER EQUIPMENT, AND NETWORK DEVICE

(71) Applicant: GUANGDONG OPPO MOBILE TELECOMMUNICATIONS CORP., LTD., Guangdong (CN)

(72) Inventors: Cong Shi, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 396 days.

(21) Appl. No.: 17/471,072

(22) Filed: Sep. 9, 2021

(65) Prior Publication Data
US 2021/0410196 A1 Dec. 30, 2021

Related U.S. Application Data

(63) Continuation of application No. PCT/CN2019/079374, filed on Mar. 22, 2019.

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
CPC ........... H04W 74/0833; H04W 74/006; H04W 74/0858
See application file for complete search history.

(56) References Cited

U.S. PATENT DOCUMENTS

| | | | |
|---|---|---|---|
| 11,304,168 B2 * | 4/2022 | Jeon | H04W 76/40 |
| 11,445,549 B2 * | 9/2022 | Yerramalli | H04W 52/50 |
| 11,678,246 B2 * | 6/2023 | Park | H04W 74/0833 455/436 |

(Continued)

FOREIGN PATENT DOCUMENTS

| | | |
|---|---|---|
| CN | 108282899 A | 7/2018 |
| CN | 108282901 A | 7/2018 |

(Continued)

OTHER PUBLICATIONS

Extended European Search Report for European Application No. 19921135.0 issued Feb. 3, 2022. 9 pages.

(Continued)

*Primary Examiner* — Yaotang Wang
(74) *Attorney, Agent, or Firm* — PERKINS COIE LLP

(57) ABSTRACT

The implementations of the present application provide a random access method and apparatus, a user equipment (UE), and a network device. The method comprises: a UE sends a first message to a network device; the UE receives a second message sent by the network device, the second message being used for responding to the first messages of one or more UEs, and the second message comprising at least one of: UE conflict resolution identification information, a dedicated radio network temporary identifier (RNTI), uplink timing advance information, and uplink scheduling information.

7 Claims, 15 Drawing Sheets

(56) References Cited

U.S. PATENT DOCUMENTS

| | | | | |
|---|---|---|---|---|
| 2014/0341163 A1* | 11/2014 | Zhang | ................... | H04B 7/024 |
| | | | | 370/329 |
| 2019/0335515 A1* | 10/2019 | Chen | ................ | H04W 74/0858 |
| 2019/0350004 A1 | 11/2019 | Zhao et al. | | |
| 2019/0380139 A1* | 12/2019 | Xiong | ................ | H04W 72/044 |
| 2020/0178318 A1* | 6/2020 | Yu | ...................... | H04W 74/006 |
| 2020/0221508 A1* | 7/2020 | Huang | ............... | H04W 74/006 |
| 2021/0410191 A1* | 12/2021 | Wu | ................. | H04W 74/0833 |
| 2023/0269783 A1* | 8/2023 | Agiwal | ............ | H04W 74/0833 |
| | | | | 370/329 |

FOREIGN PATENT DOCUMENTS

| | | |
|---|---|---|
| EP | 3562250 A1 | 10/2019 |
| WO | 2018089265 A1 | 5/2018 |
| WO | 2018119612 A1 | 7/2018 |
| WO | 2018127240 A1 | 7/2018 |
| WO | 2018127244 A1 | 7/2018 |
| WO | 2018133437 A1 | 7/2018 |

OTHER PUBLICATIONS

Qualcomm Incorporated "2-step RACH procedure consideration" R1-1700792; 3GPP TSG-RAN WG1 NR AdHoc; Jan. 16-20, 2017; Spokane, USA. 7 pages.

International Search Report issued Nov. 20, 2019 of PCT/CN2019/079374 (4 pages).

* cited by examiner

| R | R | R | R | TAC | Oct 1 |
|---|---|---|---|---|---|
| TAC | | | | | Oct 2 |

FIG. 7B

| R | R | R | R | UL Grant | Oct 1 |
|---|---|---|---|---|---|
| UL Grant | | | | | Oct 2 |
| UL Grant | | | | | Oct 3 |
| UL Grant | | | | | Oct 4 |

FIG. 7C

| R | R | R | R | TAC | Oct 1 |
|---|---|---|---|---|---|
| TAC | | | | | Oct 2 |
| TC-RNTI | | | | | Oct 3 |
| TC-RNTI | | | | | Oct 4 |

FIG. 7D

| R | R | LCID | Oct 1 |
|---|---|---|---|

FIG. 7E

RANDOM ACCESS METHOD AND APPARATUS, USER EQUIPMENT, AND NETWORK DEVICE

CROSS-REFERENCE TO RELATED APPLICATIONS

The present application is a continuation application of International PCT Application No. PCT/CN2019/079374, having an international filing date of Mar. 22, 2019. The content of the above-identified application is hereby incorporated by reference.

TECHNICAL FIELD

Implementations of the present application relate to the technical field of mobile communication, and more particularly, to a random access method and apparatus, a user equipment and a network device.

BACKGROUND

A random access procedure used in an existing Long Term Evolution (LTE) system is a four-step random access procedure. The four-step random access procedure in the LTE system continues to be used in a new radio (NR) system. With discussion for standardization, it is believed that the four-step random access procedure is more tedious and will bring a longer delay to a terminal device, so a two-step random access procedure is proposed. Msg1 and msg3 in the four-step random access procedure are transmitted through msgA in the two-step random access procedure, and msg2 and msg4 in the four-step random access procedure are transmitted through msgB in the two-step random access procedure. In the four-step random access procedure, the msg2 responds to a plurality of user equipments, however the msg4 responds to one UE. How to design msgB in the two-step random access procedure to implement a normal random access procedure is a problem to be solved.

SUMMARY

Implementations of the present application provide a random access method and apparatus, a user equipment and a network device.

A method for random access provided by an implementation of the present application includes: sending, by a UE, a first message to a network device; and receiving, by the UE, a second message sent by the network device, the second message is used for responding to the first message of one or more UEs, and the second message includes at least one of the following: UE contention resolution ID information, dedicated radio network temporary identifier (RNTI), uplink timing advance information, or uplink scheduling information.

A method for random access provided by an implementation of the present application includes: receiving, by a network device, a first message sent by a UE; and sending, by the network device, a second message to the UE, the second message is used for responding to the first message of one or more UEs, and the second message includes at least one of the following: UE contention resolution ID information, dedicated RNTI, uplink timing advance information, or uplink scheduling information.

An apparatus for random access provided by an implementation of the present application includes: a sending unit, configured to send a first message to a network device; and a receiving unit, configured to receive a second message sent by the network device, and the second message is configured to respond to the first message of one or more UEs, the second message includes at least one of the following: UE contention resolution ID information, dedicated radio network temporary identifier (RNTI), uplink timing advance information, or uplink scheduling information.

An apparatus for random access provided by an implementation of the present application includes: a receiving unit, configured to receive a first message sent by a UE; and a sending unit, configured to send a second message to the UE, and the second message is configured to respond to the first message of one or more UEs, the second message includes at least one of the following: UE contention resolution ID information, dedicated RNTI, uplink timing advance information, or uplink scheduling information.

A user equipment provided by an implementation of the present application includes a processor and a memory. The memory is configured to store a computer program, and the processor is configured to call and run the computer program stored in the memory to perform the random access methods described above.

A network device provided by an implementation of the present application includes a processor and a memory. The memory is configured to store a computer program, and the processor is configured to call and run the computer program stored in the memory to perform the random access methods described above.

A chip provided by an implementation of the present application is used for implementing the random access methods described above.

Specifically, the chip includes a processor configured to call and run a computer program from a memory, so that a device having the chip installed thereon executes the random access methods described above.

A computer readable storage medium provided by an implementation of the present application is used for storing a computer program that causes a computer to perform the random access methods described above.

A computer program product provided by an implementation of the present application includes computer program instructions that cause a computer to perform the random access methods described above.

A computer program provided by an implementation of the present application, when running on a computer, causes the computer to perform the random access methods described above.

Through the above technical solutions, contents of a second message in a two-step random access procedure is defined clearly, that is, a format of msgB is designed to implement a normal two-step random access procedure, and the format of msgB proposed by the implementations of the present application may implement responding to multiple UEs, and may further implement responding to one UE, thereby improving the two-step random access procedure.

BRIEF DESCRIPTION OF DRAWINGS

The drawings described herein are used to provide a further understanding of the present application and form a portion of the present application. Illustrative implementations of the present application and the description thereof are used to explain the present application, but do not constitute improper limitation to the present application. In the drawings:

FIG. 7B is a first structural diagram of an MAC CE according to an implementation of the present application.

FIG. 7C is a second structural diagram of an MAC CE according to an implementation of the present application.

FIG. 7D is a third structural diagram of an MAC CE according to an implementation of the present application.

FIG. 7E is a structural diagram of a subheader corresponding to an MAC CE according to an implementation of the present application.

DETAILED DESCRIPTION

Technical solutions in implementations of the present application will be described below with reference to the drawings in the implementations of the present application. It is apparent that the implementations described are just some of the implementations of the present application, but not all of the implementations of the present application. Based on the implementations of the present application, all other implementations achieved by a person of ordinary skill in the art without making inventive efforts are within the protection scope of the present application.

The technical solutions of the implementations of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
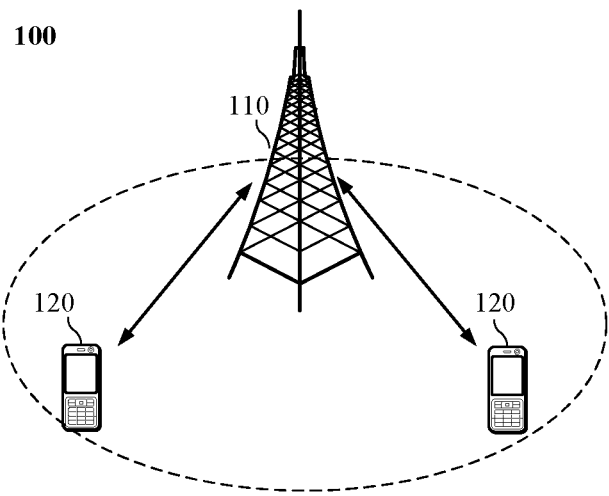
FIG. 1 is a schematic diagram of an architecture of a communication system according to an implementation of the present application.

Illustratively, a communication system 100 applied in an implementation of the present application is shown in FIG. 1. The communication system 100 may include a network device 110, which may be a device that communicates with a user equipment 120 (or referred to as a communication terminal, or a terminal). The network device 110 may provide communication coverage for a specific geographical area, and may communicate with UEs located within the coverage area. Optionally, the network device 110 may be a base transceiver station (BTS) in a GSM system or CDMA system, a NodeB (NB) in a WCDMA system, an Evolutional Node B (eNB or eNodeB) in an LTE system, or a radio controller in a cloud radio access network (CRAN), or the network device may be a network side device in a mobile switching center, a relay station, an access point, a vehicle-mounted device, a wearable device, a hub, a switch, a bridge, a router, or a network side device in a 5G network, or a network device in a future evolved public land mobile network (PLMN), etc.

The communication system 100 further includes at least one user equipment 120 located within the coverage area of the network device 110. The term "user equipment" as used herein includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a digital video broadcasting-handheld (DVB-H) network, a satellite network, and an amplitude modulation—frequency modulation (AM-FM) broadcast transmitter; and/or another UE; and/or an Internet of Things (IoT) device. A user equipment configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of being combined with a cellular radio phone with data processing, faxing, and data communication abilities; a personal digital assistant (PDA) that may include a radio telephone, a pager, internet/intranet access, a Web browser, a memo pad, a calendar, and/or a Global Positioning System (GPS) receiver; and a conventional laptop and/or palmtop receiver or other electronic apparatus including a radio phone transceiver. The user equipment may refer to an access terminal, a subscriber unit, a subscriber station, a mobile station, a rover platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a UE in a 5G network, or a user equipment in a future evolved Public Land Mobile Network (PLMN), or the like.

Optionally, device to device (D2D) communication may be established between the user equipments 120.

Optionally, the 5G system or 5G network may be referred to as a new radio (NR) system or a NR network.

FIG. 1 exemplifies one network device and two user equipments. Optionally, the communication system 100 may include multiple network devices, and another quantity of user equipments may be included within a coverage area of each network device, which is not limited in the implementations of the present application.

Optionally, the communication system 100 may include other network entities, such as a network controller and a mobile management entity, which is not limited in the implementations of the present application.

It should be understood that a device with a communication function in a network/system in the implementations of the present application may be referred to as a communication device. Taking the communication system 100 shown in FIG. 1 as an example, the communication device may include a network device 110 and a user equipment 120 which have communication functions, and the network device 110 and the user equipment 120 may be the specific devices described above, and will not be described repeatedly herein. The communication device may also include other devices in the communication system 100, such as a network controller, a mobile management entity, and other network entity, which is not limited in the implementations of the present application.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

In order to facilitate understanding of the technical solutions of the implementations of the present application, technological concepts related to the implementations of the present application will be described below.

Figure 2:
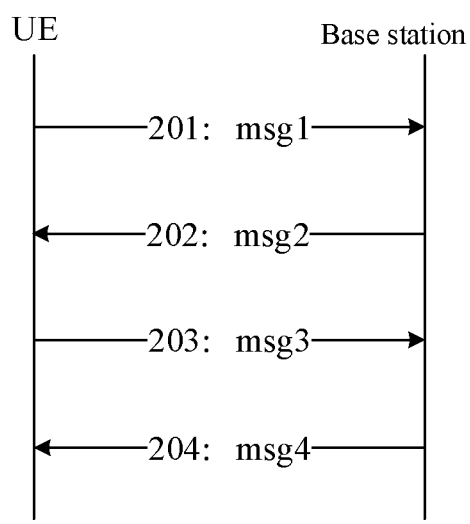
FIG. 2 is a flow chart of a four-step random access procedure according to an implementation of the present application.

Random access is an important process of establishing a wireless connection between a UE and a network side, and the UE can achieve uplink synchronization with a base station through the random access and apply for uplink resources. The random access procedure is divided into a contention-based random access procedure and a noncontention-based random access procedure. The contention-based random access procedure includes a four-step random access procedure and a two-step random access procedure. FIG. 2 shows a flow chart of the four-step random access procedure, which, as shown in FIG. 2, includes the following acts.

In act 201, a UE sends msg1 to a base station.

Herein, the UE sending the msg1 to the base station may be implemented specifically through the following process.

The UE determines a relationship between Synchronization Signal Blocks (SSBs) and Physical Random Access Channel (PRACH) resources (configured by a higher layer);

the UE receives a set of SSBs and determines Reference Signal Received Power (RSRP) values thereof, and selects appropriate SSBs according to a threshold value;

the UE determines the PRACH resources based on the selected SSBs and the corresponding relationship between the SSBs and the PRACH resources; and the UE sends a preamble on PRACH time-frequency domain resources.

In act 202, the UE receives msg2 sent by the base station.

Herein, the UE receiving the msg2 sent by the base station may be implemented specifically through the following process.

the UE opens a ra-Response (RAR) window on a first Physical Downlink Control Channel (PDCCH) occasion after sending the preamble, and monitors the PDCCH during running of the window, where the PDCCH is a PDCCH scrambled by an RA-RNTI. The RA-RNTI is related to the PRACH time-frequency resources selected by the UE, and is calculated as follows:

$$RA\text{-}RNTI = 1 + s\_id + 14 \times t\_id + 14 \times 80 \times f\_id + 14 \times 80 \times 8 \times ul\_carrier\_id$$

herein s_id is an index of a first OFDM symbol of the PRACH resources ($0 \leq s\_id \leq 14$); t_id is an index of a first time slot of the PRACH resources in a system frame ($0 \leq t\_id \leq 80$); f_id is an index of a PRACH occasion in the frequency domain ($0 \leq f\_id \leq 8$); and ul_carrier_id is an uplink (UL) carrier for transmission of a preamble index.

Figure 3A:
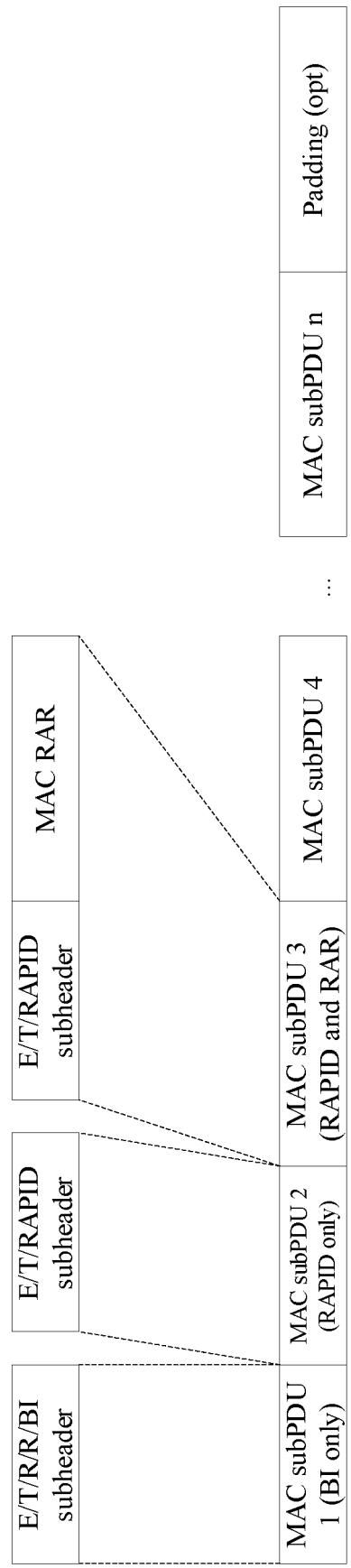
FIG. 3A is a structural diagram of an MAC PDU according to an implementation of the present application.
Figure 3B:
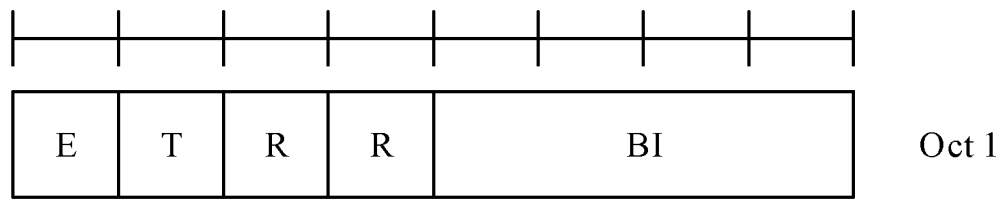
FIG. 3B is a structural diagram of an E/T/R/R/BI subheader according to an implementation of the present application.
Figure 3C:
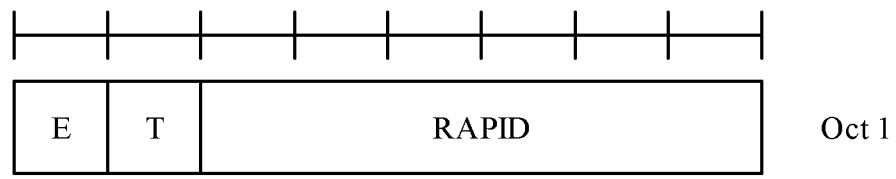
FIG. 3C is a structural diagram of an E/T/RAPID subheader according to an implementation of the present application.
Figure 3D:
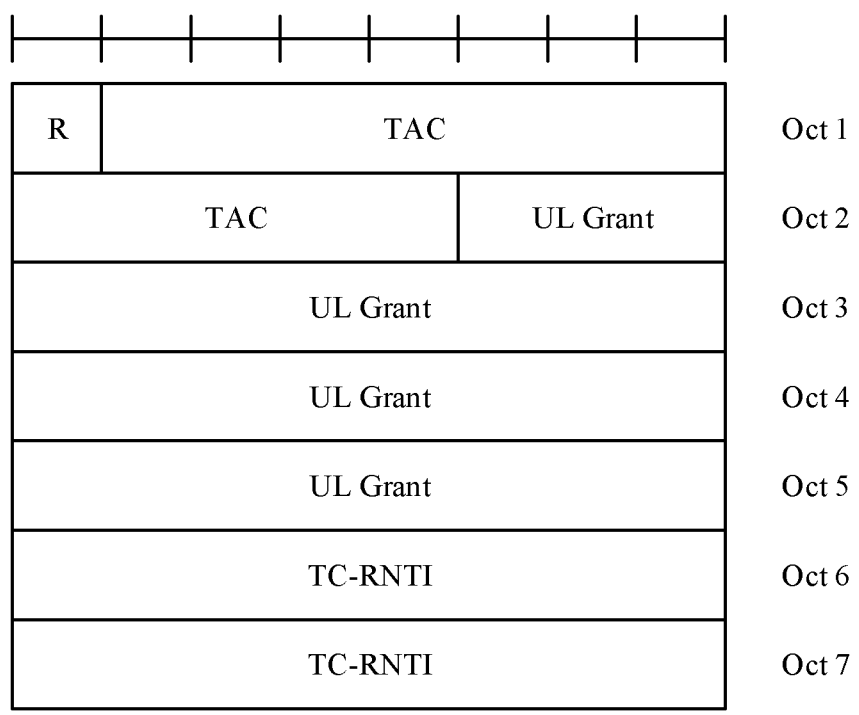
FIG. 3D is a structure diagram of an MAC RAR according to an implementation of the present application.

The UE can obtain a PDSCH scheduled by the PDCCH after monitoring the PDCCH scrambled by the RA-RNTI successfully, herein a data format of an MAC PDU containing a RAR is shown in FIG. 3A, and the MAC PDU includes a plurality of MAC subPDUs, namely an MAC subPDU1, an MAC subPDU2, an MAC subPDU3 and so on. The MAC subPDU1 contains a backoff indication (BI), and the MAC subPDU1 contains an E/T/R/R/BI subheader, a structure of which is shown in FIG. 3B. The MAC subPDU2 contains a random access preamble ID (RAPID), and the MAC subPDU2 contains an E/T/RAPID subheader, a structure of which is shown in FIG. 3C. The remaining MAC subPDUs (e.g., the MAC subPDU3) contain a RAPID and a RAR. Taking the MAC subPDU3 as an example, the MAC subPDU3 contains an E/T/RAPID subheader and an MAC RAR. A structure of the E/T/RAPID subheader is shown in FIG. 3C, and a structure of the MAC RAR is shown in FIG. 3D. Each of information in FIGS. 3B to 3D is introduced as follows:

BI: backoff indication information, used for indicating backoff time of retransmission of a first message.

RAPID: a preamble index received by a network response.

R: standing for a reserved bit region.

TAC: a Timing Advance Command, used for adjusting uplink timing.

UL Grant: Uplink Grant, used for indicating resources for uplink transmission of Msg3.

TC-RNTI: a temporary cell RNTI (C-RNTI), used for a terminal to scramble the Msg3 sent subsequently.

In act 203, the UE sends msg3 to the base station.

The msg3 is mainly used for sending a UE ID to the network device to solve contention. For example, in case of an initial access random procedure, the msg3 carries a RRC layer message, that is, a CCCH SDU, which contains the UE ID and RRCSetupRequest; and in case of RRC re-establishment, the msg3 carries RRCRestablishmentRequest.

In act 204, the UE receives msg4 sent by the base station.

The msg4 has two functions, one is for contention resolution; and another is to transmit an RRC configuration message to the terminal. Herein, if the UE receives DCI format 1_0 scrambled by a cell-radio network temporary identifier (C-RNTI) and its corresponding PDSCH, the random access is completed; if the terminal receives DCI format 1_0 scrambled by a TC-RNTI and its corresponding PDSCH, and comparison of contents is successful, the random access is completed.

The two-step random access procedure is a standardization discussion process and is in a research stage. The two-step random access procedure may increase delay and reduce signaling overhead as well. At present, there is a basic way in which msgA transmits msg1 and msg3 of the four-step random access procedure, and msgB transmits msg2 and msg4 of the four-step random access procedure.

Since RAR in a traditional four-step random access procedure responds to a plurality of UEs and contains RAR information corresponding to the plurality of UEs, each piece of RAR information may further contain a TAC, a UL Grant and a TC-RNTI. The msg4 (contention response message) in the four-step random access procedure may respond to one UE (e.g., the msg4 is scheduled by a PDCCH scrambled by a C-RNTI), or may also respond to the plurality of UEs (e.g., the msg4 is scheduled by the PDCCH scrambled by the C-RNTI), herein whether a contention resolution ID MAC CE is carried in msg4 is determined according to whether or not the UE carrying a C-RNTI MAC CE in the msg3. In the two-step random access procedure, msgB needs to contain contents of msg2 and msg4 of the four-step random access procedure. Therefore, the following technical solutions of the implementations of the present application are proposed.

Figure 4:
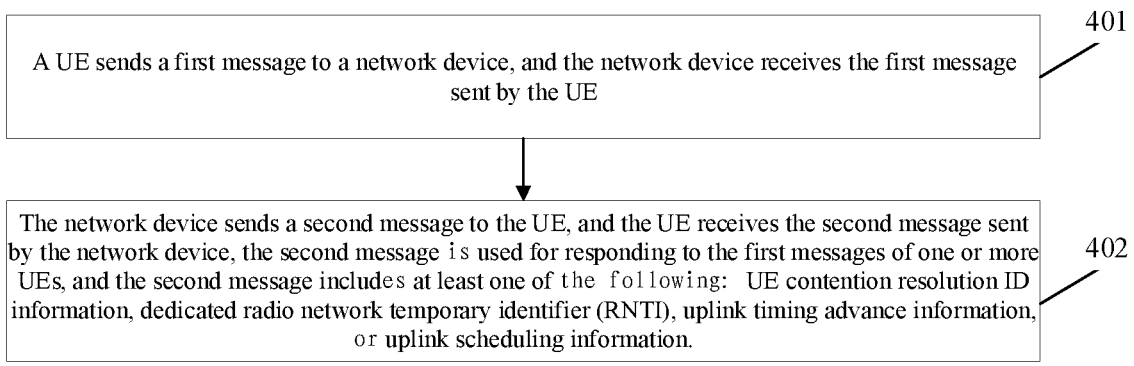
FIG. 4 is a schematic flow chart of a method for random access according to an implementation of the present application.

FIG. 4 is a schematic flow chart of a random access method according to an implementation of the present application, which is applied to a two-step random access procedure. As shown in FIG. 4, the random access method includes the following acts.

In act 401, a UE sends a first message to a network device, and the network device receives the first message sent by the UE.

In act 402, the network device sends a second message to the UE, and the UE receives the second message sent by the network device, the second message is used for responding to the first messages of one or more UEs, and the second message includes at least one of the following: UE contention resolution ID information, dedicated radio network temporary identifier (RNTI), uplink timing advance information, or uplink scheduling information.

The network device mentioned in implementations of the present application includes, but is not limited to, an LTE base station (eNB) and an NR base station (gNB).

The UE mentioned in implementations of the present application may be any device capable of communicating with the network device, such as a mobile phone, a notebook computer, a tablet computer, a vehicle-mounted terminal, or a wearable terminal.

The two-step random access procedure includes two steps: 1) the UE sends msgA to the network device; and 2) the network device sends msgB to the UE. In one implementation of the present application, the second message is msgB, and the first message mentioned in implementations of the present application is msgA.

In an implementation of the present application, the second message may respond to a plurality of UEs or one UE, and the two cases will be described below respectively.

Case 1: the second message is used for responding to the first message of the plurality of UEs, and the plurality of UEs correspond to the same random access RNTI (RA-RATI), and scheduling information of the second message is scrambled by the random access RNTI corresponding to the plurality of UEs.

The second message includes an MAC PDU, and a format of the MAC PDU may be designed as follows.

A first format (referring to the following application example one): the second message includes an MAC PDU which includes a plurality of first MAC subPDUs, each of which includes a first subheader and a first MAC RAR, the first subheader carries a RAPID, and the first MAC RAR carries the UE contention resolution ID information and a temporary cell RNTI.

Further, the MAC PDU further includes a second MAC subPDU including a second subheader, and the second subheader carries backoff indication information.

In an implementation, in the MAC PDU of the first format, the first MAC RAR further carries uplink timing advance information and/or uplink scheduling information.

A second format (referring to the following application example two): the second message includes an MAC PDU, which includes a plurality of first MAC subPDUs and a plurality of third MAC subPDUs. Each of the first MAC subPDUs includes a first subheader and a first MAC RAR, the first subheader carries a RAPID and an LCID, and the first MAC RAR carries the UE contention resolution ID information and the temporary cell RNTI. Each of the third MAC subPDUs includes a third subheader and a first MAC SDU, and the third subheader carries the RAPID, LCID and SDU length information. Herein, there is a corresponding relationship between the first MAC subPDUs and the third MAC subPDUs. In an implementation, the first MAC SDU in the third MAC subPDU is used for carrying a radio resource control (RRC) message.

Further, the MAC PDU further includes a second MAC subPDU, which includes a second subheader carrying backoff indication information.

In an implemenatation, in the MAC PDU of the second format, the first MAC RAR further carries uplink timing advance information and/or uplink scheduling information.

For the UE, the UE sends the first message to the network device, the first message includes a first preamble and a first UE identifier; the UE detects whether first MAC subPDU in an MAC PDU contains a RAPID corresponding to the first preamble after receiving the MAC PDU sent by the network device; if the first MAC subPDU in the MAC PDU contains the RAPID corresponding to the first preamble, and the UE contention resolution ID information in the first MAC subPDU is consistent with the first UE identifier, the UE determines contention resolution; and if all the first MAC subPDUs in the MAC PDU do not contain the RAPID corresponding to the first preamble, or the first MAC subPDU in the MAC PDU contains the RAPID corresponding to the first preamble but the UE contention resolution ID information in the first MAC subPDU is inconsistent with the first UE identifier, the UE retransmits the first message based on the backoff indication information in the second MAC subPDU.

Case 2: the second message is used for responding to a first message of one UE, and the scheduling information of the second message is scrambled by a cell RNTI of the one UE.

The second message includes a MAC PDU, a format of which may be designed as follows (referring to the following application example three): the second message includes the MAC PDU, which includes a plurality of fourth MAC subPDUs, each of which includes an MAC CE, and a plurality of MAC CEs in the MAC PDU carry at least one piece of the following information: uplink timing advance information, temporary cell RNTI, BSR and PHR.

For the UE, the UE sends a first message to the network device, the first message includes a first preamble and a first UE identifier; the UE determines contention resolution after successfully descrambling scheduling information of the second message using the cell RNTI of the UE.

The technical solutions of the implementations of the present application will be described below by way of example in conjunction with specific application examples. It should be noted that in the following examples, a UE performing the two-step random access procedure will be called a two-step RACH UE, and a UE performing the four-step random access procedure will be called a four-step RACH UE.

Application Example One: msgB Responds to a Plurality of UEs

1. After sending msgA, a two-step RACH UE enables a scheduling instruction for a window/timer to blindly detect the msgB.

2. The scheduling instruction may be blindly detected by a plurality of two-step RACH UEs using the same resources in the msgA, that is, the msgB responds to the plurality of UEs.

The same resources in the msgA herein may mean that PRACH resources in the msgA are the same, or that PUSCH resources in the msgA are the same, or that both PRACH resources and PUSCH resources in the msgA are the same.

Figure 5A:
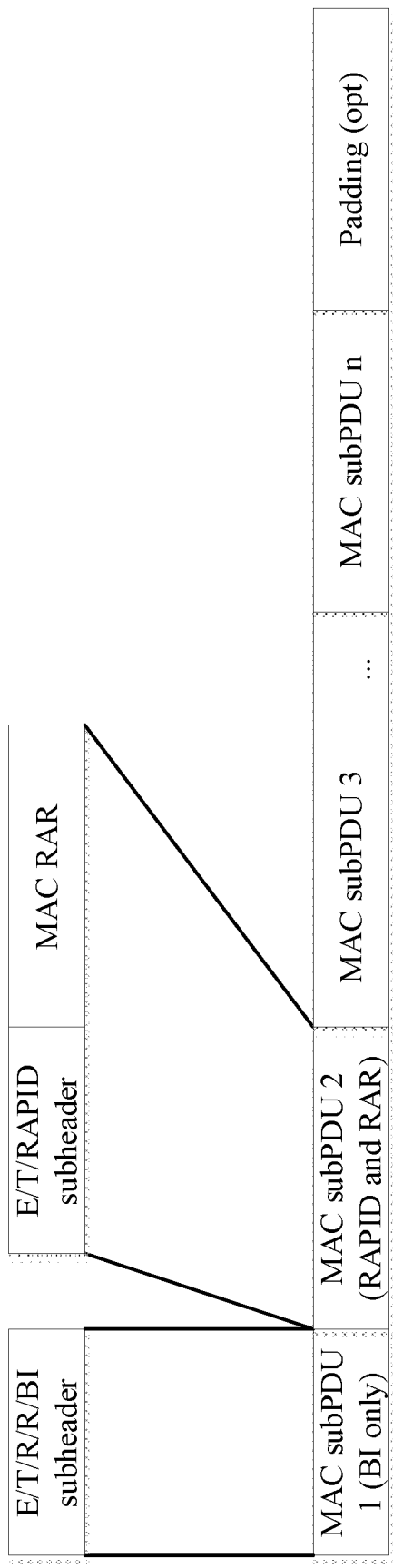
FIG. 5A is a first structural diagram of an MAC PDU according to an implementation of the present application.

3. The msgB contains an MAC PDU, which at least contains a contention resolution message responding to a plurality of UEs. A possible structure of the MAC PDU is shown in FIG. 5A, that is, the MAC PDU contains one or more MAC subPDUs. The first MAC subPDU is an MAC subPDU with only a subheader, and its structure is consistent with the existing BI header, as shown in FIG. 3B. Other MAC subPDUs contain a subheader corresponding to a MAC RAR respectively. The MAC subheader is consistent with an MAC subheader in the existing RAR, as shown in FIG. 3C.

Figure 5B:
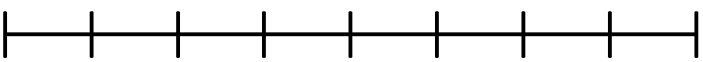
FIG. 5B is a first structural diagram of a MAC RAR according to an implementation of the present application.

A structure of an MAC RAR is shown in FIG. 5B. The MAC RAR has 9 bytes in total, herein the TAC is a TAC in an RAR in the existing four-step random access procedure, which is used for adjusting uplink timing of uplink transmission for a corresponding UE. The TC-RNTI is a TC-RNTI in the existing four-step random access procedure, which is upgraded to a C-RNTI after contention resolution in a case if the UE does not have the C-RNTI, and is used for blindly detecting the UE's dedicated data scheduling channel. The UE contention resolution ID is a CONTENTION RESOLUTION ID MAC CE carried in the existing msg4.

Figure 5C:
FIG. 5C is a second structural diagram of an MAC RAR according to an implementation of the present application.

A structure of another MAC RAR is shown in FIG. 5C. Compared with the MAC RAR in FIG. 5B, the MAC RAR in FIG. 5C further contains a UL grant (or the UL grant may also be a DL grant).

4. When the UE blindly detects the PDCCH scheduling the msgB by using the calculated RNTI, such as RA-RNTI, the UE will determine whether the MAC PDU in the msgB contains a RAPID corresponding to a preamble index in the msgA. If there is a corresponding RAPID, and the UE contention resolution ID therein is consistent with information carried by payload in the msgA, the contention is resolved. If the UE has blindly detected the msgB, but the UE contention resolution ID therein is inconsistent with the information carried by the payload in the msgA, or even there is no RAPID corresponding to the preamble index, then the UE retransmits the msgA using backoff indicated by BI.

A disadvantage of the application example one is that if the msgB is scheduled by the PDCCH scrambled by the traditional RA-RNTI, and the two-step RACH UE and the four-step RACH UE share RACH resources (including RO and PREAMBLE), it is possible that the four-step RACH UE may also detect the msgB blindly, but the four-step RACH UE cannot recognize the msgB (because it is a new format), which may cause the four-step RACH UE to report an error. There are several methods to avoid this problem.

Method one: the PRACH resources (including RO and PREAMBLE) of the four-step RACH UE and the two-step RACH UE are separated completely, so that the two UEs cannot detect each other's messages, that is, the four-step RACH UE can only detect the traditional RAR, and the two-step RACH UE can only detect large msgB;

Method two: if the PRACH resources of the four-step RACH UE and the two-step RACH UE cannot be separated completely, then separating search spaces of blind detecting msg2 of the four-step RACH UE from search spaces of blind detecting msgB of the two-step RACH UE;

Method three: a new way may be designed for blind detecting the RNTI of the msgB by the two-step RACH UE. For example, positions of the PUSCH resources are considered in the calculation of the RARNTI.

Figure 5D:
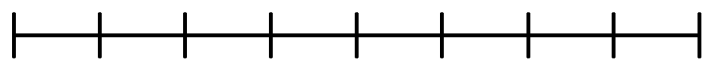
FIG. 5D is a third structural diagram of an MAC RAR according to an implementation of the present application.

The format of the MAC RAR shown in FIG. 5B may also be changed to a format of an MAC RAR shown in FIG. 5D. Advancing the UE contention resolution ID may further improve efficiency of UE contention resolution, that is, if it is determined that the UE contention resolution ID does not match, the following TAC and TC-RNTI do not need to be read any more.

Figure 5E:
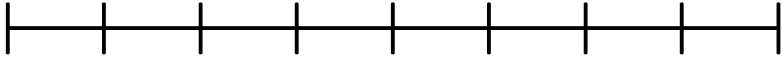
FIG. 5E is a fourth structural diagram of an MAC RAR according to an implementation of the present application.

The format of the MAC RAR shown in FIG. 5D may also be changed to a format of a MAC RAR shown in FIG. 5E. Since the msgB is downlink, it does not need to carry the TAC, which can be indicated to the UE by the network device after the UE receives the msgB, for example, the TAC may be indicated to the UE in a manner of an MAC CE through the following PDCCH or in downlink data scheduled by the PDCCH.

In the above application example one, a format of msgB is designed for a scenario that msgB responds to a plurality of UEs, and only contains some contents of RAR in msg2 in a traditional four-step RACH UE, and an RRC message will be contained in another downlink message scheduled by the network. Such design may effectively reduce the size of msgB TB, and may reuse some formats in existing protocols meanwhile.

Application Example Two: msgB Responds to a Plurality of UEs

1. After sending msgA, the two-step RACH UE enables a scheduling instruction for a window/timer to blindly detect the msgB.

2. The scheduling instruction may be blindly detected by a plurality of two-step RACH UEs by using the same resources in the msgA, that is, the msgB responds to the plurality of UEs.

Figure 6A:
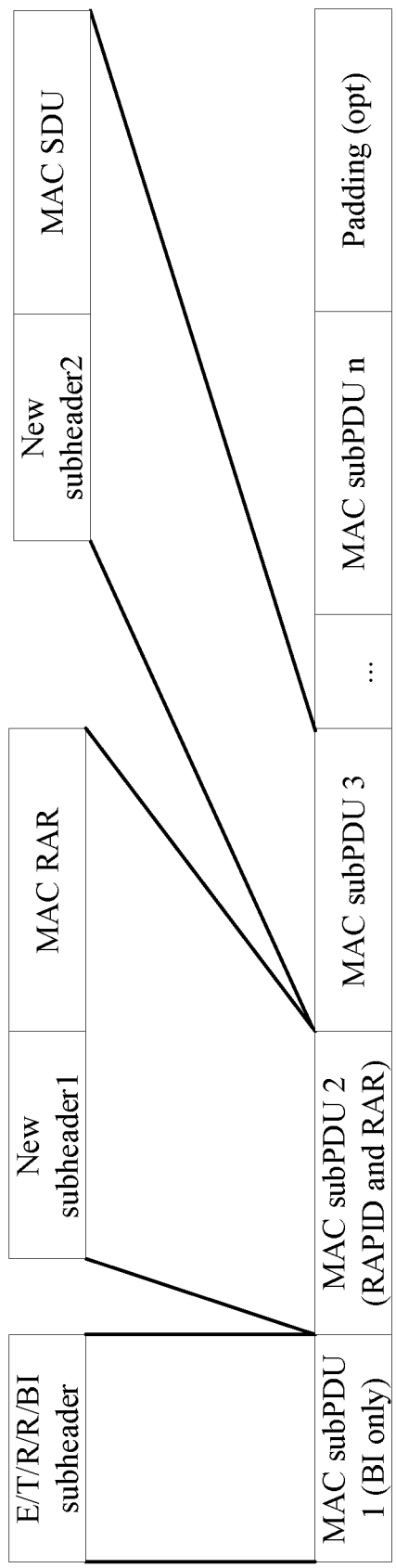
FIG. 6A is a second structural diagram of an MAC PDU according to an implementation of the present application.
Figure 6B:
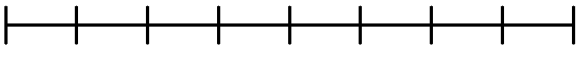
FIG. 6B is a diagram of a new subheader1 format according to an implementation of the present application.
Figure 6C:
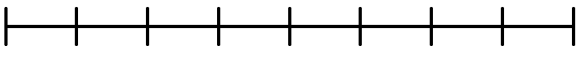
FIG. 6C is a first diagram of a new subheader2 format according to an implementation of the present application.
Figure 6D:
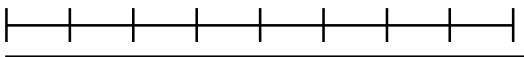
FIG. 6D is a diagram of a second new subheader2 format according to an implementation of the present application.

3. The msgB contains one MAC PDU, which at least contains a contention resolution message responding to the plurality of UEs. A possible structure of the MAC PDU is shown in FIG. 6A, that is, the MAC PDU contains one or more MAC subPDUs. The first MAC subPDU is an MAC subPDU with only a subheader, and its structure is consistent with the existing BI header, as shown in FIG. 3B. Other MAC subPDUs each contain a subheader (a new subheader1) corresponding to an MAC RAR or a subheader (a new subheader2) corresponding to an MAC SDU. A format of the new subheader1 is shown in FIG. 6B, herein the RAPID is a preamble index in the corresponding msgA, if the preamble index carried in the msgA is consistent with the RAPID, the UE will process the MAC subPDU, a format of the MAC RAR corresponding to the new subheader1 is consistent with the format in the application example one. The MAC subPDU may also contain an RRC message, which, for example, includes the new subheader2 and the MAC SDU. A format of the new subheader2 is as shown in FIG. 6C or FIG. 6D, herein the RAPID is the same as the new subheader1, the LCID corresponds to a specific SDU type, and L indicates a length of the SDU, where L may be 1 byte or 2 bytes. It should be noted that the RAPID in the new subheader2 may also be omitted, for example, the MAC subPDU carrying the RAR is immediately followed by the MAC subPDU carrying the RRC message, so that the UE may assume that the two MAC subPDUs correspond to one RAPID. Alternatively, one R bit may be used in the new subheader1 to indicate whether the MAC subPDU carrying the RAR is immediately followed by the MAC subPDU carrying the RRC message. In the MAC PDU, the MAC subPDU carrying the MAC RAR and the MAC subPDU carrying the RRC message are usually connected together. That is, after the UE contacts the MAC RAR, it will be indicated whether the MAC RAR is followed by the corresponding RRC message.

4. When the UE blindly detects the PDCCH scheduling the msgB by using the calculated RNTI, such as RA-RNTI, the UE will determine whether the MAC PDU in the msgB contains a RAPID corresponding to the preamble index in the msgA. If there is a corresponding RAPID, and the UE contention resolution ID therein is consistent with information carried by payload in the msgA, the contention is resolved. If the UE has blindly detected the msgB, but the UE contention resolution ID therein is inconsistent with the information carried by the payload in the msgA, or even there is no RAPID corresponding to the preamble index, the UE retransmits the msgA using backoff indicated by BI.

The difference between the application example two and the application example one is that the msgB can contain the RRC message, so that the UE can complete a RACH procedure and a RRC layer procedure by only detecting the msgB once.

Application Example Three: msgB Responds to One UE

1. After sending msgA, the two-step RACH UE enables a scheduling instruction for a window/timer to blindly detect the msgB.

2. The scheduling instruction can be blindly detected by only one two-step RACH UE, that is, the msgB only responds to one UE; and the msgB is scheduled by a PDCCH scrambled by a C-RNTI, which is included in payload of the msgA of the two-step RACH UE.

Figure 7A:
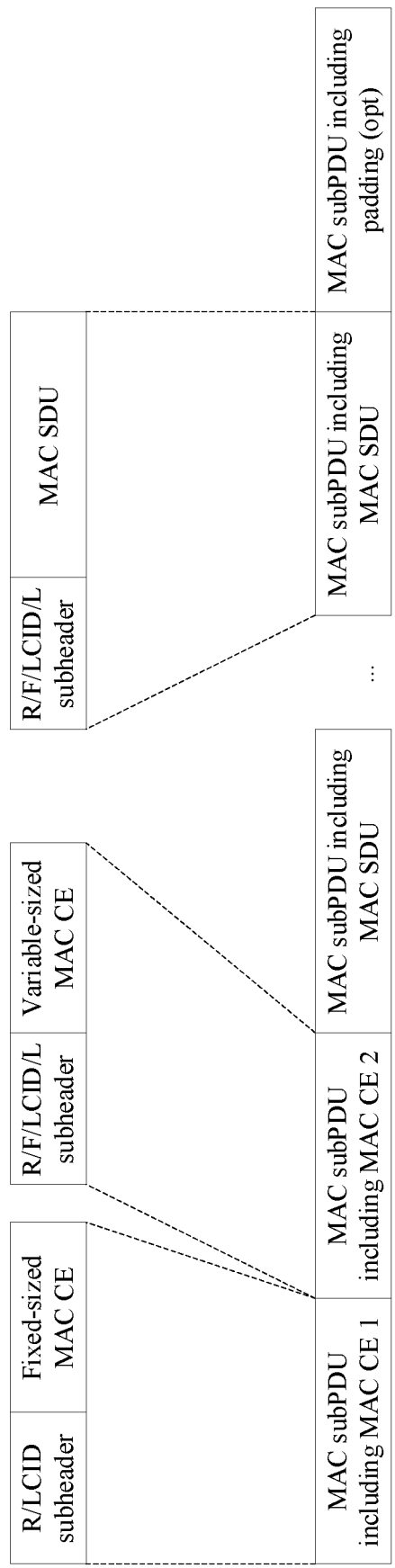
FIG. 7A is a third structural diagram of an MAC PDU according to an implementation of the present application.

3. The msgB contains an MAC PDU, a format of which is consistent with the format of the existing downlink MAC PDU, as shown in FIG. 7A. Further, the MAC PDU may contain an MAC CE indicating a TAC, which is an MAC CE with a fixed size, and has a structure shown in FIG. 7B; or the MAC PDU may contain an MAC CE of a UL grant, which is an MAC CE with a fixed size, and has a structure shown in FIG. 7C; or the MAC PDU may contain an MAC CE indicating a TC-RNTI and a TAC, which is an MAC CE with a fixed size, and has a structure shown in FIG. 7D. A subheader corresponding to the MAC CE is shown in FIG. 7E, in which an LCID needs to be redefined. The MAC PDU may also carry user plane data, and an RRC layer signaling, etc.

4. When the UE blindly detects the PDCCH scheduling the msgB by using the C-RNTI, a two-step RACH contention has been resolved. The UE will decode the msgB scheduled by the PDCCH, and the MAC PDU of the msgB contains portion of information contained in a traditional four-step RACH RAR, such as TAC.

In the above application example three, for a scenario that msgB responds to one UE, a TAC MAC CE needs only to be carried, so that a design for an MAC PDU of msgB greatly reuses the existing design.

Figure 8:
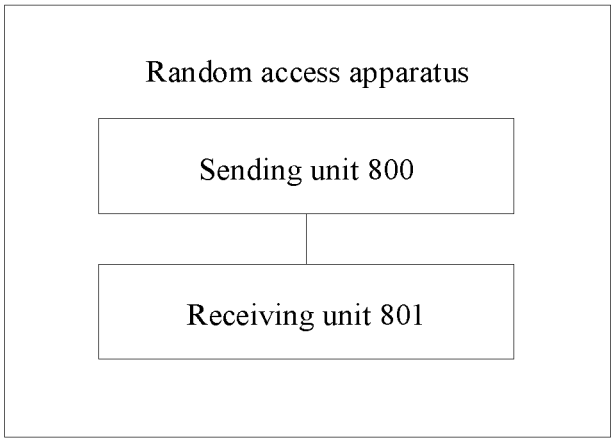
FIG. 8 is a first schematic structural composition diagram of an apparatus for random access according to an implementation of the present application.

FIG. 8 is a first schematic n diagram of composition structure of an apparatus for random access provided by an implementation of the present application. As shown in FIG. 8, the first random access apparatus includes a sending unit 800 and a receiving unit 801.

The sending unit 800 is configured to send a first message to a network device; and the receiving unit 801 is configured to receive a second message sent by the network device, and the second message is used for responding to the first message of one or more UEs, the second message includes at least one of the following: UE contention resolution ID information, dedicated radio network temporary identifier (RNTI), uplink timing advance information, or uplink scheduling information.

In an implementation, in a case that the second message is used for responding to the first message of a plurality of UEs, the plurality of UEs correspond to the same random access RNTI, and the scheduling information of the second message is scrambled by the random access RNTI corresponding to the plurality of UEs.

In an implementation, the second message includes an MAC PDU, which includes a plurality of first MAC subPDUs, each of which includes a first subheader and a first MAC RAR, the first subheader carries a RAPID, and the first MAC RAR carries the UE contention resolution ID information and a temporary cell RNTI.

In an implementation, the MAC PDU further includes a second MAC subPDU, which includes a second subheader, and the second subheader carries backoff indication information.

In an implementation, the first subheader further carries a LCID.

The MAC PDU further includes a plurality of third MAC subPDUs, each of which includes a third header and a first MAC SDU, and the third header carries the RAPID, the LCID and SDU length information.

In an implementation, there is a corresponding relationship between the first MAC SDUs and the third MAC subPDUs.

In an implementation, the first MAC SDU in the third MAC subPDU is used for carrying a radio resource control (RRC) message.

In an implementation, the first MAC RAR further carries the uplink timing advance information and/or uplink scheduling information.

In an implementation, the receiving unit 801 detects whether the first MAC subPDU in the MAC PDU contains a RAPID corresponding to a first preamble after receiving the MAC PDU sent by the network device; and determines contention resolution if the first MAC subPDU in the MAC PDU contains the RAPID corresponding to the first preamble, and the UE contention resolution ID information in the first MAC subPDU is consistent with a first UE identifier. If all the first MAC subPDUs in the MAC PDU do not contain the RAPID corresponding to the first preamble, or the first MAC subPDU in the MAC PDU contains the RAPID corresponding to the first preamble but the UE contention resolution ID information in the first MAC subPDU is inconsistent with the first UE identifier, the sending unit 800 retransmits the first message based on the backoff indication information in the second MAC subPDU.

In an implementation, in a case that the second message is used for responding to the first message of one UE, the scheduling information of the second message is scrambled by the cell RNTI of the UE.

In an implementation, the second message includes an MAC PDU, which includes a plurality of fourth MAC subPDUs, each of which includes an MAC CE, and a plurality of MAC CEs in the MAC PDU carry at least one of the following: uplink timing advance information, temporary cell RNTI, BSR or PHR.

In an implementation, the receiving unit 801 determines that the contention is resolved after successfully descrambling the scheduling information of the second message by using the cell RNTI of the UE.

Those skilled in the art should understand that the relevant description for the random access apparatus in the implementation of the present application may be understood with reference to the relevant description for the random access method in the implementation of the present application.

Figure 9:
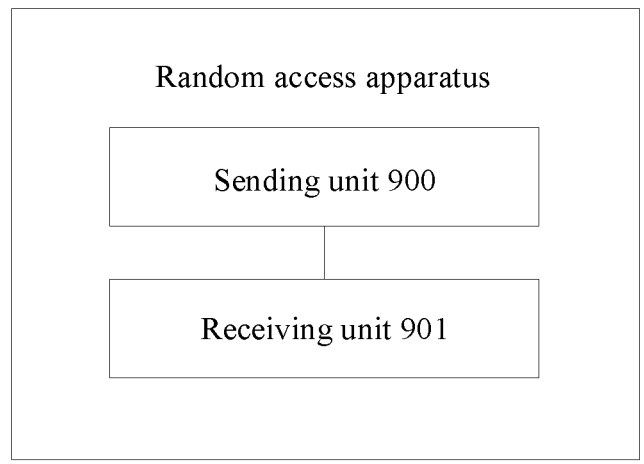
FIG. 9 is a second schematic structural composition diagram of an apparatus for random access according to an implementation of the present application.

FIG. 9 is a second schematic diagram of structure composition of an apparatus for random access provided by an implementation of the present application. As shown in FIG. 9, the apparatus for random access includes a receiving unit 900 and a sending unit 901.

The receiving unit 900 is configured to receive a first message sent by a UE; and the sending unit 901 is configured to send a second message to the UE, the second message is used for responding to the first message of one or more UEs, and the second message includes at least one of the following: UE contention resolution ID information, dedicated radio network temporary identifier (RNTI), uplink timing advance information, or uplink scheduling information.

In an implementation, in a case that the second message is used for responding to the first message of a plurality of UEs, the plurality of UEs correspond to the same random access RNTI, and the scheduling information of the second message is scrambled by the random access RNTI corresponding to the plurality of UEs.

In an implementation, the second message includes an MAC PDU, which includes a plurality of first MAC subPDUs, each of which includes a first subheader and a first MAC RAR, the first subheader carries a RAPID, and the first MAC RAR carries the UE contention resolution ID information and a temporary cell RNTI.

In an implementation, the MAC PDU further includes a second MAC subPDU, which includes a second subheader, and the second subheader carries backoff indication information.

In an implementation, the first subheader further carries a LCID.

The MAC PDU further includes a plurality of third MAC subPDUs, each of which includes a third header and a first MAC SDU, and the third header carries the RAPID, the LCID and SDU length information.

In an implementation, there is a corresponding relationship between the first MAC SDUs and the third MAC subPDUs.

In an implementation, the first MAC SDU in the third MAC subPDU is used for carrying a radio resource control (RRC) message.

In an implementation, the first MAC RAR further carries the uplink timing advance information and/or the uplink scheduling information.

In an implementation, in a case that the second message is used for responding to the first message of one UE, the scheduling information of the second message is scrambled by the cell RNTI of the UE.

In an implementation, the second message includes an MAC PDU, which includes a plurality of fourth MAC subPDUs, each of which includes an MAC CE, and a plurality of MAC CEs in the MAC PDU carry at least one of the following: the uplink timing advance information, the temporary cell RNTI, BSR or PHR.

Those skilled in the art should understand that the relevant description for the apparatus for random access in the implementation of the present application may be understood with reference to the relevant description for the method for random access in the implementation of the present application.

Figure 10:
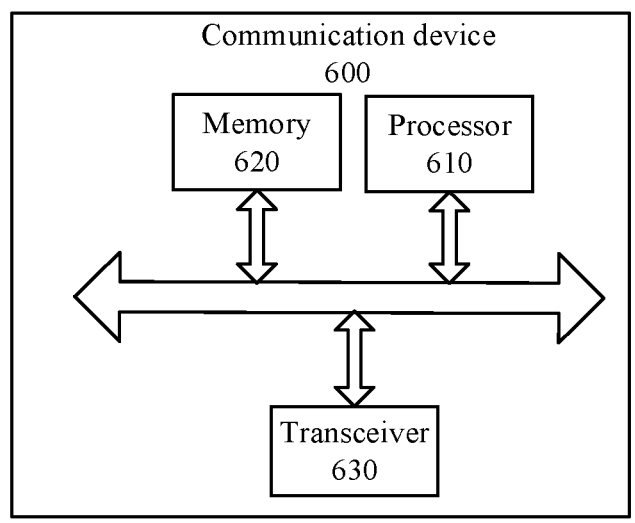
FIG. 10 is a schematic structural diagram of a communication device according to an implementation of the present application.

FIG. 10 is a schematic structural diagram of a communication device 600 provided by an implementation of the present application. The communication device may be a user equipment or a network device. The communication device 600 shown in FIG. 10 includes a processor 610, which may call and run a computer program from a memory to implement the method in the implementations of the present application.

Optionally, as shown in FIG. 10, the communication device 600 may further include a memory 620. The processor 610 may call and run the computer program from the memory 620 to implement the method in the implementation of the present application.

The memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, the number of antennas may be one or more.

Optionally, the communication device 600 may specifically be a network device of the implementation of the present application, and the communication device 600 may implement the corresponding processes implemented by the network device in various methods of the implementations of the present application, which will not be repeated herein for brevity.

Optionally, the communication device 600 may specifically be the mobile terminal/user equipment of the implementations of the present application, and the communication device 600 may implement the corresponding processes implemented by the mobile terminal/user equipment in various methods of the implementations of the present application, which will not be repeated herein for brevity.

Figure 11:
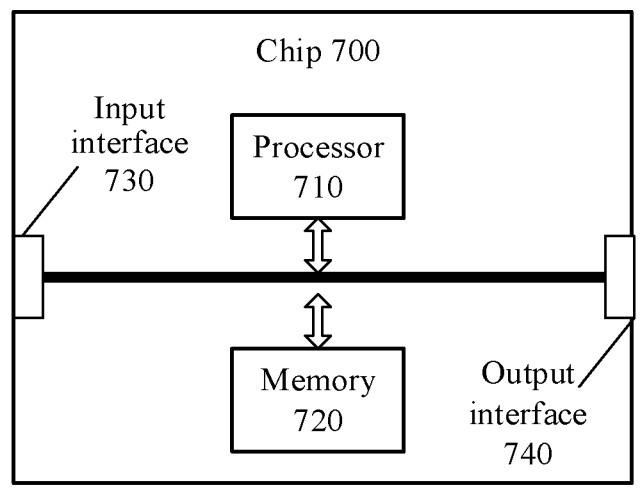
FIG. 11 is a schematic structural diagram of a chip according to an implementation of the present application.

FIG. 11 is a schematic diagram of a structure of a chip of an implementation of the present application. The chip 700 shown in FIG. 11 includes a processor 710. The processor 710 may call and run a computer program from a memory to implement the method in the implementation of the present application.

Optionally, as shown in FIG. 11, the chip 700 may further include a memory 720. The processor 710 may call and run the computer program from the memory 720 to implement the method in the implementation of the present application.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present application, and the chip may implement the corresponding processes implemented by the network device in various methods of the implementations of the present application, which will not be repeated herein for brevity.

Optionally, the chip may be applied in a mobile terminal/user equipment of the implementation of the present application, and the chip may implement the corresponding processes implemented by the mobile terminal/user equipment in various methods of the implementations of the present application, which will not be repeated herein for brevity.

It should be understood that the chip mentioned in the implementation of the present application may be referred to as a system-level chip, a system chip, a chip system or a system-on-chip, etc.

Figure 12:
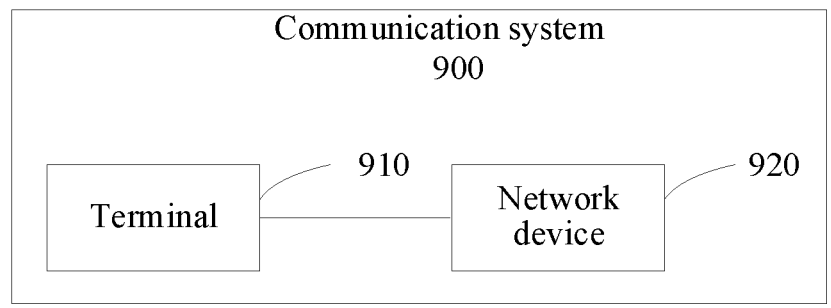
FIG. 12 is a schematic block diagram of a communication system according to an implementation of the present application.

FIG. 12 is a schematic block diagram of a communication system 900 provided by an implementation of the present application. As shown in FIG. 12, the communication system 900 may include a terminal 910 and a network device 920.

Herein, the terminal 910 may be configured to implement the corresponding functions implemented by the user equipment in the methods described above, and the network device 920 may be configured to implement the corresponding functions implemented by the network device in the methods described above, which will not be described repeatedly herein for brevity.

It should be understood that the processor in this implementations of the present application may be an integrated circuit chip having a signal processing capability. In an implementation process, each of the steps of the foregoing method implementations may be completed through an integrated logic circuit of hardware in the processor or instructions in a form of software. The processor above may be a general purpose processor, a Digital Signal Processor (DSP), an Application Specific Integrated Circuit (ASIC), a Field Programmable Gate Array (FPGA) or other programmable logic device, a discrete gate or a transistor logic device, or a discrete hardware component. The processor may implement or perform various methods, steps and logical block diagrams disclosed in the implementations of the present application. The general purpose processor may be a microprocessor, or the processor may also be any conventional processor or the like. The steps of the methods disclosed with reference to the implementations of the present application may be directly implemented to be completed by a hardware decoding processor, or may be implemented by a combination of the hardware in the decoding processor and software modules. The software modules may be located in a storage medium commonly used in the art, such as a random access memory, a flash memory, a read-only memory, a programmable read-only memory, an electrically erasable programmable memory, or a register, etc. The storage medium is located in the memory, and the processor reads the information in the memory and completes the acts of the foregoing methods in combination with its hardware.

It may be understood that the memory in this implementation of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described in this specification is aimed at including, but being not be limited to, these and any other suitable types of memories.

It should be understood that, the foregoing memory is described in an example for illustration and should not be construed as limiting. For example, the memory in the implementations of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, memories in the implementations of the present application are intended to include, but are not limited to, these and any other suitable types of memories.

An implementation of the present application further provides a computer-readable storage medium configured to store a computer program.

Optionally, the computer-readable storage medium may be applied in a network device of the implementation of the present application, and the computer program causes a computer to perform the corresponding processes implemented by the network device in various methods of the implementations of the present application, which will not be repeated herein for brevity.

Optionally, the computer-readable storage medium may be applied in a mobile terminal/user equipment of the implementation of the present application, and the computer program causes a computer to perform the corresponding processes implemented by the mobile terminal/user equipment in various methods of the implementations of the present application, which will not be repeated herein for brevity.

An implementation of the present application further provides a computer program product including computer program instructions.

Optionally, the computer program product may be applied in a network device of the implementation of the present application, and the computer program instructions cause a computer to perform the corresponding processes implemented by the network device in various methods of the implementations of the present application, which will not be repeated herein for brevity.

Optionally, the computer program product may be applied in a mobile terminal/user equipment of the implementation of the present application, and the computer program instructions cause a computer to perform the corresponding processes implemented by the mobile terminal/user equipment in various methods of the implementations of the present application, which will not be repeated herein for brevity.

An implementation of the present application further provides a computer program.

Optionally, the computer program may be applied in a network device of the implementation of the present application, and when the computer program is run on a computer, the computer is enabled to perform the corresponding processes implemented by the network device in various methods of the implementations of the present application, which will not be repeated herein for brevity.

Optionally, the computer program may be applied in a mobile terminal/user equipment of the implementation of the present application, and when the computer program is run on a computer, the computer is enabled to perform the corresponding processes implemented by the mobile terminal/user equipment in various methods of the implementations of the present application, which will not be repeated herein for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the forgoing method implementations and will not be repeated herein.

In several implementations provided by the present invention, it should be understood that the disclosed systems, apparatuses and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Some or all of the units may be selected according to actual needs to achieve the purpose of the implementations.

In addition, various functional units in various implementations of the present application may be integrated into one processing unit, or the various units may be physically present separately, or two or more than two units may be integrated into one unit.

The functions may be stored in a computer-readable storage medium if achieved in a form of software functional unit and sold or used as an independent product. Based on such understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device, etc.) to perform all or part of the acts of the method described in various implementations of the present application. The foregoing storage medium includes: any medium that can store program code, such as a USB flash disk, a mobile hard disk, a read-only memory (ROM), a random access memory (RAM), a magnetic disk, or an optical disk.

What are described above are merely specific implementations of the present application, but the protection scope of the present application is not limited thereto. Any variation or substitution that may easily conceived by a person familiar with the art within the technical scope disclosed by the present application shall be included within the protection scope of the present application. Therefore, the protection scope of the present application shall be subject to the protection scope of the claims.

What we claim is:

1. A method for random access, comprising:
   sending, by a user equipment (UE), a first message to a network device; and
   receiving, by the UE, a second message sent by the network device, wherein the second message is used for responding to the first message of one or more UEs, and the second message comprises at least one of the following: UE contention resolution ID information, dedicated radio network temporary identifier (RNTI), uplink timing advance information, or uplink scheduling information; wherein in a case that the second message is used for responding to the first message of one UE, the uplink scheduling information of the second message is scrambled by a cell RNTI of the UE; wherein in a case that the second message is used for responding to the first message of a plurality of UEs, the plurality of UEs correspond to same random access RNTI, and the uplink scheduling information of the second message is scrambled by the random access RNTI corresponding to the plurality of UEs; wherein the second message comprises a media access control (MAC) protocol data unit (PDU), which comprises a plurality of first MAC subPDUs, each of which comprises a first subheader and a first media access control (MAC) ra-Response (RAR), and the first subheader carries a random access preamble ID (RAPID), and the first MAC RAR carries the UE contention resolution ID information and a temporary cell RNTI; wherein the MAC PDU further comprises a second MAC subPDU, which comprises a second subheader, and the second subheader carries backoff indication information; wherein the MAC PDU further comprises a plurality of third MAC subPDUs, and the first MAC SDU in the third MAC subPDU is used for carrying a radio resource control (RRC) message.

2. The method of claim 1, wherein the first MAC RAR further carries the uplink timing advance information and/or the uplink scheduling information.

3. The method of claim 1, further comprises:
determining, by the UE, contention resolution after successfully descrambling the uplink scheduling information of the second message using the cell RNTI of the UE.

4. A method for random access, comprising:
receiving, by a network device, a first message sent by a UE; and
sending, by the network device, a second message to the UE, wherein the second message is used for responding to the first message of one or more UEs, and the second message comprises at least one of the following: UE contention resolution ID information, dedicated RNTI, uplink timing advance information, or uplink scheduling information; wherein in a case that the second message is used for responding to the first message of one UE, the uplink scheduling information of the second message is scrambled by a cell RNTI of the UE; wherein in a case that the second message is used for responding to the first message of a plurality of UEs, the plurality of UEs correspond to same random access RNTI, and the uplink scheduling information of the second message is scrambled by the random access RNTI corresponding to the plurality of UEs; wherein the second message comprises an MAC PDU, which comprises a plurality of first MAC subPDUs, each of which comprises a first subheader and a first MAC RAR, and the first subheader carries a RAPID, and the first MAC RAR carries the UE contention resolution ID information and a temporary cell RNTI; wherein the MAC PDU further comprises a second MAC subPDU, which comprises a second subheader, and the second subheader carries backoff indication information; wherein the MAC PDU further comprises a plurality of third MAC subPDUs, and the first MAC SDU in the third MAC subPDU is used for carrying a radio resource control (RRC) message.

5. An apparatus for random access, comprising a processor and a memory, wherein the processor is configured to execute instructions stored in the memory to perform following operations:
sending a first message to a network device; and
receiving a second message sent by the network device, wherein the second message is configured to respond to the first message of one or more UEs, and the second message comprises at least one of the following: UE contention resolution ID information, dedicated radio network temporary identifier (RNTI), uplink timing advance information, or uplink scheduling information; wherein in a case that the second message is used for responding to the first message of one UE, the uplink scheduling information of the second message is scrambled by a cell RNTI of the UE; wherein in a case that the second message is used for responding to the first message of a plurality of UEs, the plurality of UEs correspond to same random access RNTI, and the uplink scheduling information of the second message is scrambled by the random access RNTI corresponding to the plurality of UEs; wherein the second message comprises a media access control (MAC) protocol data unit (PDU), which comprises a plurality of first MAC subPDUs, each of which comprises a first subheader and a first media access control (MAC) ra-Response (RAR), and the first subheader carries a random access preamble ID (RAPID), and the first MAC RAR carries the UE contention resolution ID information and a temporary cell RNTI; wherein the MAC PDU further comprises a second MAC subPDU, which comprises a second subheader, and the second subheader carries backoff indication information; wherein the MAC PDU further comprises a plurality of third MAC subPDUs, and the first MAC SDU in the third MAC subPDU is used for carrying a radio resource control (RRC) message.

6. The apparatus of claim 5, wherein the processor is further configured to execute instructions stored in the memory to perform following operation: determining contention resolution after successfully descrambling the uplink scheduling information of the second message using the cell RNTI of the UE.

7. An apparatus for random access, comprising a processor and a memory, wherein the processor is configured to execute instructions stored in the memory to perform following operation:
receiving a first message sent by a UE; and
sending a second message to the UE, wherein the second message is configured to respond to the first message of one or more UEs, and the second message comprises at least one of the following: UE contention resolution ID information, dedicated radio network temporary identifier (RNTI), uplink timing advance information, or uplink scheduling information; wherein in a case that the second message is used for responding to the first message of one UE, the uplink scheduling information of the second message is scrambled by a cell RNTI of the UE; wherein in a case that the second message is used for responding to the first message of a plurality of UEs, the plurality of UEs correspond to same random access RNTI, and the uplink scheduling information of the second message is scrambled by the random access RNTI corresponding to the plurality of UEs; wherein the second message comprises a media access control (MAC) protocol data unit (PDU), which comprises a plurality of first MAC subPDUs, each of which comprises a first subheader and a first media access control (MAC) ra-Response (RAR), and the first subheader carries a random access preamble ID (RAPID), and the first MAC RAR carries the UE contention resolution ID information and a temporary cell RNTI; wherein the MAC PDU further comprises a second MAC subPDU, which comprises a second subheader, and the second subheader carries backoff indication information; wherein the MAC PDU further comprises a plurality of third MAC subPDUs, and the first MAC SDU in the third MAC subPDU is used for carrying a radio resource control (RRC) message.

* * * * *